Figure 1:
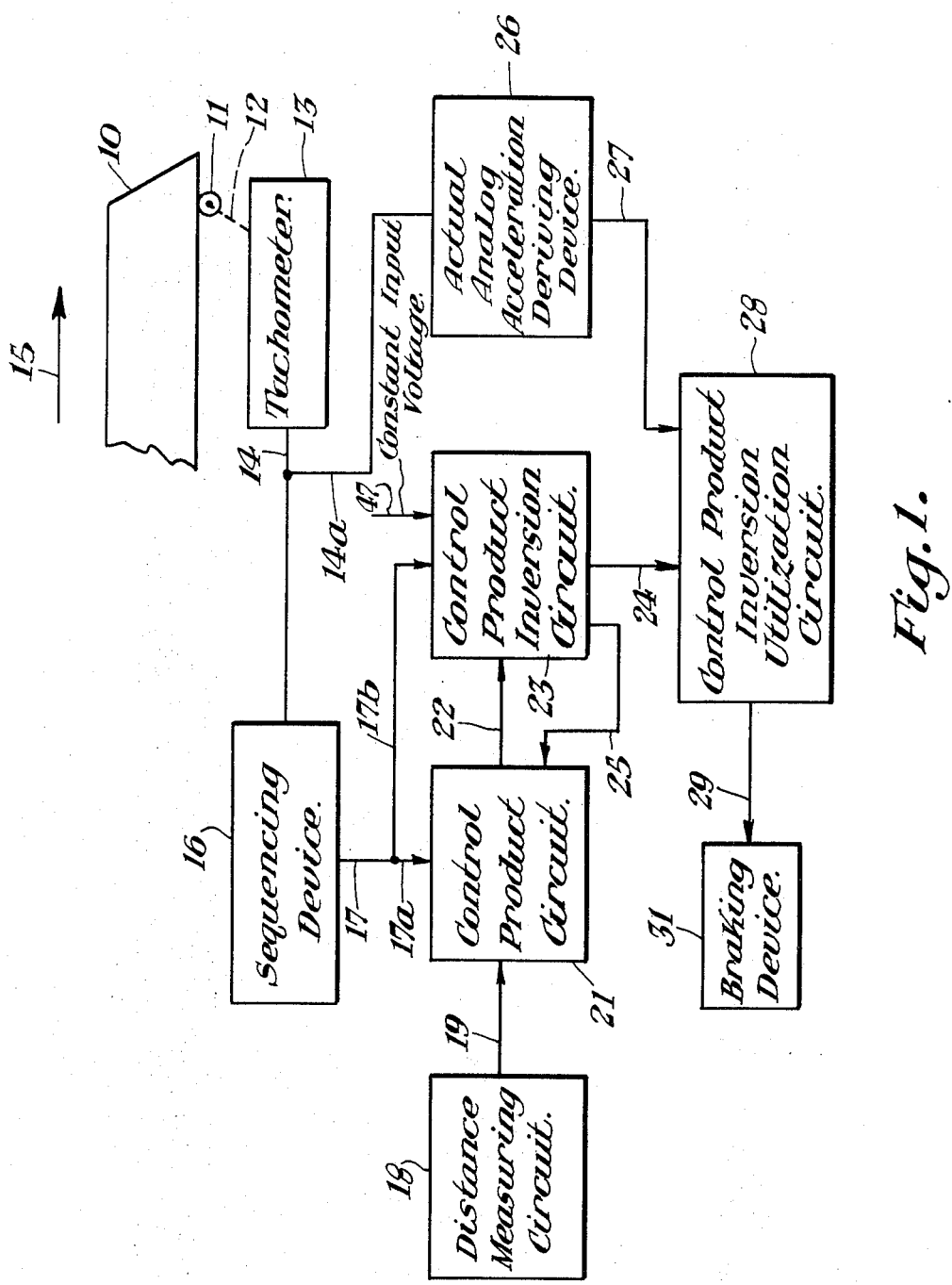

United States Patent

[11] 3,575,592

| [72] | Inventors | William L. Carter Jr. |
|------|-----------|-----------------------|
|      |           | Pittsburgh; |
|      |           | Raymond G. Stein, Jr., Allison Park, Pa. |
| [21] | Appl. No. | 796,517 |
| [22] | Filed     | Feb. 4, 1969 |
| [45] | Patented  | Apr. 20, 1971 |
| [73] | Assignee  | Westinghouse Air Brake Company |
|      |           | Swissvale, Pa. |

[54] ACCELERATION REFERENCE CIRCUIT
6 Claims, 3 Drawing Figs.

[52] U.S. Cl.................................................... 235/183,
235/150.2, 73/507
[51] Int. Cl..................................................... G06g 7/18,
G06g 7/78
[50] Field of Search......................................... 235/183,
150, 27, 150.2, 150.24; 73/503, 507, 511, 514;
324/68—70

[56] References Cited
UNITED STATES PATENTS
3,353,631  11/1967  Burgy............................  235/183UX

| 3,431,778 | 3/1969 | Lemon et al.................. | 235/150.2X |
| 3,454,752 | 7/1969 | Zauod......................... | 235/150.2X |
| 3,519,805 | 7/1970 | Thorne-Booth.............. | 235/150.2 |

Primary Examiner—Eugene G. Botz
Assistant Examiner—Joseph F. Ruggiero
Attorneys—H. A. Williamson, A. G. Williamson, Jr. and J. B. Sotak ABSTRACT: This invention relates to an acceleration reference circuit for producing and utilizing a first parameter analogous and proportional to a control acceleration of a vehicle. This first parameter is compared with a second parameter analogous and proportional to actual vehicle acceleration. The measuring of the vehicle acceleration will occur over a predetermined distance range. The above is achieved through the use of a pulse input indicative of vehicle speed, an analog voltage input indicative of distance remaining to the end point of the predetermined distance range, and a constant voltage input, all intercorrelated by sequencing devices, integrators, and level detectors.

ACCELERATION REFERENCE CIRCUIT

This invention relates to an acceleration reference circuit.

More specifically, this invention relates to an acceleration reference circuit for producing and utilizing a first parameter analogous and proportional to a control acceleration of a vehicle which is accomplished by comparing this first parameter to a second parameter analogous and proportional to actual vehicle acceleration, the aforementioned referencing therefor occurring over a predetermined distance range. The acceleration reference circuit of the instant invention includes a sequencing device, a control product circuit, a control product inversion circuit, and a control product inversion utilization circuit.

The sequencing device has a pulse input as well as a pulse output, which pulse input has a pulse rate in accordance with the velocity of the vehicle. The pulse input has a period equal to $\Delta t$ seconds while the output from the sequencing device is a pulse output which has a one-half period equal to $\Delta t$ seconds.

The control product circuit has first, second, and third inputs. The first input of the control produce circuit is a level varying voltage which is analogous to the distance left to be traveled over the above-noted predetermined distance range. The second input of the control product circuit is the pulse output from the sequencing device which is analogous to speed. The control product circuit produces an output which has a peak value at the end of $\Delta t$ seconds. This peak value is the product of the level varying voltage and the square of a one-half period of the digital pulse output of the sequencing device.

The control product inversion circuit has first, second, and third inputs. The first input of the control product inversion circuit is the output from the control product circuit, the second input is the pulse output from the sequencing device, and the third input is a preselected constant voltage. The control product inversion circuit produces first and second outputs, the first output of the control product inversion circuit is controllingly electrically coupled to the control product circuit as the third input to the control product circuit and the second output of which is inversely proportional to the output of the control product circuit, has a peak value at the end of $\Delta t$ seconds, and is directly proportional and analogous to the above-noted vehicle control acceleration.

The control product inversion utilization circuit has first and second inputs. The first input is the output from the control product inversion circuit while the second input is the above-noted second parameter analogous and proportional to actual vehicle acceleration. The control product utilization circuit produces an output which is a comparison of the actual vehicle acceleration parameter and the vehicle control acceleration parameter.

Knowing the velocity of a train and the distance the train is from a desired stopping point, it is possible to calculate the deceleration necessary at any given point, from initial point to stopping point, in order to stop the train at the desired stopping point. A mathematical interpretation for desired deceleration yields the following:

(1) $$v = \frac{ds}{dt}$$

where $v$ = velocity
$s$ = distance
$t$ = time.

In words (1) states the velocity at any given time is equal to the derivative of distance with respect to time.

(2) $$a = \frac{dv}{dt}$$

where $a$ = deceleration

In words (2) states that acceleration at any given time is equal to the derivation of velocity with respect to time.

Dividing (2) by (1) we have:

(3) $$\frac{a}{v} = \frac{dv/dt}{ds/dt}$$

or $$ads = vdv$$

Integrating both sides of equation (3), the left side from zero (distance traveled at starting point) to $D$ (distance traveled to stopping point), and the right side from $V$ (velocity of train at starting point) to zero (velocity of train at stopping point) we have:

(4) $$\int_0^D ads \int_V^0 vdv$$

Since it is desired that $a$ be constant we may bring $a$ outside the integration sign on the left side of equation (4). Thus, we have:

(5) $$a\int_0^D ds = \int_V^0 vdv$$

Performing the integration within the limits of equation (5) we have:

(6) $$aD = \frac{-V^2}{2}$$

or $$a = \frac{-V^2}{2D}$$

Thus, knowing $V$ and $D$, the deceleration rate, $a$, can be computed. However, this calculation involves a squaring process and a division, both difficult to perform in an analog or digital manner. For this reason equation (6) must be modified slightly by the following method.

In railroad operations train velocity is normally measured by tachometers which produce output pulses the frequency of which varies according to train velocity. Thus, train velocity can be defined as:

(7) $$V = \frac{\Delta D}{\Delta t}$$

where $\Delta D$ represents the distance a train wheel moves between each tachometer pulse (a constant) and where $\Delta t$ is for one complete tachometer cycle to occur.

Substituting equation (7) into equation (6) we have:

(8) $$a = \frac{-V^2}{2D} = \frac{-(\Delta D/\Delta t)^2}{2D} = \frac{K}{D(\Delta t)^2}$$

where $$K = \frac{-(\Delta D)^2}{2} \text{ constant}$$

Thus if a signal proportional to $1/D\,(\Delta t)^2$ can be generated in an analog manner, there will, in effect, be generated continuously the deceleration necessary at any point to stop at the above-noted stopping point, i.e., a function will be generated which very closely approximates $$a = \frac{-V^2}{2D}$$

In the past, methods have been used to measure train velocity with reference to a preselected stopping point. Given a profile of velocity with respect to distance from the desired stopping point, if the distance from the desired stopping point at any time is known, it is possible to choose the reference velocity of the profile and compare this reference velocity with the actual velocity of the train. The generation of the actual train velocity required electric circuitry which by incorporating parameters such as inertia, friction, and the like, brought about a considerable phase shift in the feedback loop which was employed for comparison of the above-noted reference velocity and actual train velocity. Thus, if there was a need for correction, the inherent phase-shift of the prior art circuitry hampered the correction process timewise and therefore increased error due to circuit instability. Other errors could also have arisen due to distance indication circuitry or a 0.1 percent to 1 percent error in the reference velocity profile curve. Accordingly, it was found that it would be more advantageous to feed back actual train acceleration in order to compare it with a reference acceleration eliminating much of the aforementioned phase-shift and shortening time response to error. The present invention provides the advantages lacking in the prior art with accuracy never before achieved.

It is, therefore, an object of this invention to provide a new and improved acceleration reference circuit which accurately measures vehicle acceleration over a given distance range.

Another object of this invention is to provide a novel acceleration reference circuit which is independent of a desired velocity profile.

Yet another object of this invention is to provide an improved acceleration reference circuit which limits inherent circuit error due to phase-shift.

Still another object of this invention is to provide a new and improved acceleration reference circuit with a fast error-correcting response.

Yet still another object of this invention is to provide a novel acceleration circuit which measures vehicle acceleration by the employment of a sequencing means in combination with a control product circuit, a control product inversion circuit which produces a control product analogous and inversely proportional to a control acceleration, and a control product inversion utilization circuit which produces a control product inversion analogous and directly proportional to control acceleration, in order that actual train acceleration is compared to control acceleration.

In the attainment of the foregoing objects an acceleration reference circuit for producing and utilizing a first parameter analogous and proportional to a control acceleration of a vehicle is accomplished by comparing this first parameter to a second parameter analogous and proportional to actual vehicle acceleration. Accordingly, measuring will occur over a predetermined distance range. This invention includes in combination a sequencing device, a control product circuit, a control product inversion circuit, and a control product inversion utilization circuit.

The sequencing device has a pulse input as well as a pulse output. The pulse rate of this input is in accordance with the velocity of the aforementioned vehicle. The pulse input to the sequencing device has a period equal to $\Delta t$ seconds, while the pulse output of the sequencing device has a one-half period equal to $\Delta t$ seconds.

The control product circuit includes in combination a first integrating circuit, a control product sequencing device, and a second integrating circuit. The first integrating circuit of the control product circuit has first and second inputs and an output. The first input to the first integrating circuit is a level varying analog voltage, while the second input to the first integrating circuit is the pulse output of the above-mentioned sequencing device. Finally, the output of the first integrating circuit is the integration of the level varying analog voltage input over $\Delta t$ seconds, reaching a peak value, at the end of $\Delta t$ seconds, equal to the product of the level varying analog voltage and $\Delta t$ seconds.

The second integrating circuit of the control product circuit has first and second inputs and an output. The first input to the second integrating circuit is the output from the above-noted first integrating circuit, while the second input to the second integrating circuit is the output from the control product sequencing device. Accordingly, the second integrating circuit simultaneously integrates the output of the first integrating circuit over $\Delta t$ seconds, thus producing the output of the second integrating circuit. The output of the second integrating circuit has a peak value equal to the produce of the above-noted level varying analog voltage and the square of $\Delta t$ seconds. This peak value of the output from the second integrating circuit is held for a holding time $(t_1 - \Delta t)$ seconds, where the time $t_1$ is determined by an output from the above-noted control product inversion circuit.

The control product inversion circuit includes in combination a control product inversion sequencing device, a level limiting circuit, a third integrating circuit, and a fourth integrating circuit. The control product inversion sequencing device has first and second inputs and an output. The first input is the output from the aforementioned sequencing device.

The level limiting circuit of the control product inversion circuit has an input and an output. The level limiting circuit produces its output whenever the input of the level limiting circuit reaches a predetermined peak value.

The third integrating circuit has first and second inputs and an output. The first input to the third integrating circuit is the output from the control product circuit, while the second input to the third integrating circuit is the output from the control product inversion sequencing device. This second input controllingly regulates the third integrating circuit such that the third integrating circuit will only integrate the output from the second integrating circuit at times greater than or equal to the above-noted time $\Delta t$ seconds. Thus, the output from the third integrating circuit is produced to provide the input to the above-noted level limiting circuit. This output from the third integrating circuit reaches the aforementioned predetermined peak value at time $t_1$ to thereby cause the level limiting circuit to produce its output. The output from the level limiting circuit is controllingly electrically coupled to the control product inversion sequencing device as its second input. The output from the level limiting circuit is also controllingly electrically coupled to the control product sequencing device as its second input to thereby hold the peak value of the output of the second integrating circuit for the aforementioned holding time, $(t_1 - \Delta t)$ seconds. The output from the control product inversion sequencing device is controllingly electrically coupled to the third integrating circuit as its second input.

The fourth integrating circuit has first and second inputs and an output. The first input to the fourth integrating circuit is a preselected constant voltage, while the second input to the fourth integrating circuit is the output from the control product inversion sequencing device. Accordingly, the fourth integrating circuit will integrate its preselected constant voltage input from the time $\Delta t$ seconds to the time $t_1$ seconds to thereby provide the output of the fourth integrating circuit. This output reaches a peak value at $t_1$ seconds. This peak value of the output from the fourth integrating circuit is the above-noted first parameter analogous and proportional to the aforementioned control vehicle acceleration.

The control product inversion utilization circuit includes in combination a control product inversion peak output holding circuit, and a comparison circuit. The control product inversion peak output holding circuit has an input and an output. The input to the control product inversion peak output holding circuit is the output from the fourth integrating circuit. The output of the control product inversion peak output holding circuit is the aforementioned peak value of the output from the fourth integrating circuit.

The comparison circuit of the control product inversion utilization circuit has first and second inputs and an output. The first input of the comparison circuit is the output of the control product inversion peak output holding circuit. The second input to the comparison circuit is the aforementioned second parameter analogous and proportional to actual vehicle acceleration. Accordingly, the comparison circuit will produce an output whenever the actual vehicle acceleration parameter and control vehicle acceleration parameter are unequal. This output of the comparison circuit thereby provides the above-noted acceleration monitoring.

Other objects and advantages of the present invention will become apparent from the ensuing description of illustrative embodiments thereof, in the course of which reference is had to the accompanying drawings in which:

FIG. 1 depicts an embodiment of the present invention in block diagram form.

Figure 2:
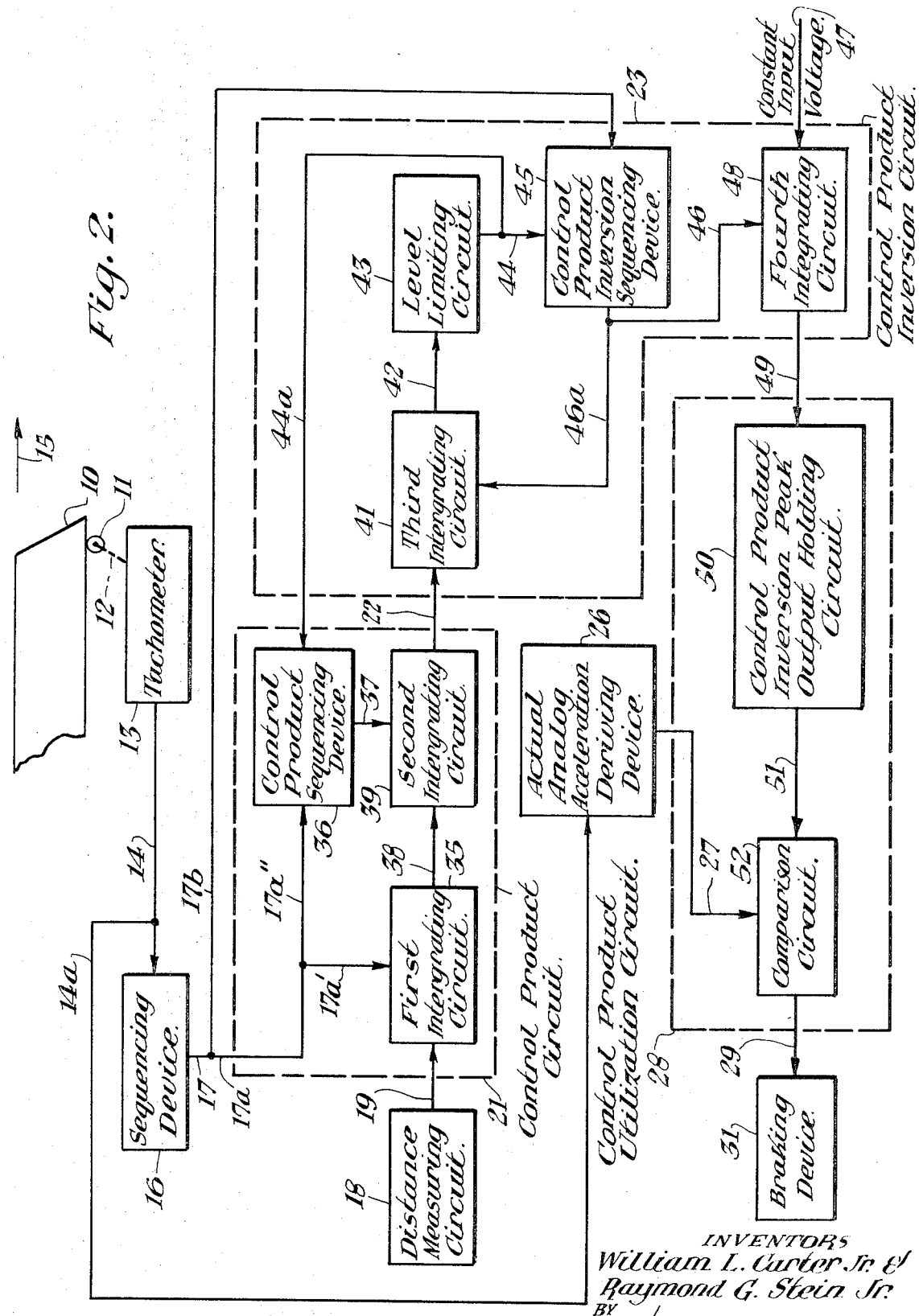

FIG. 2 sets forth the embodiment of the present invention of FIG. 1 in a more detailed block diagram form.

Figure 3:
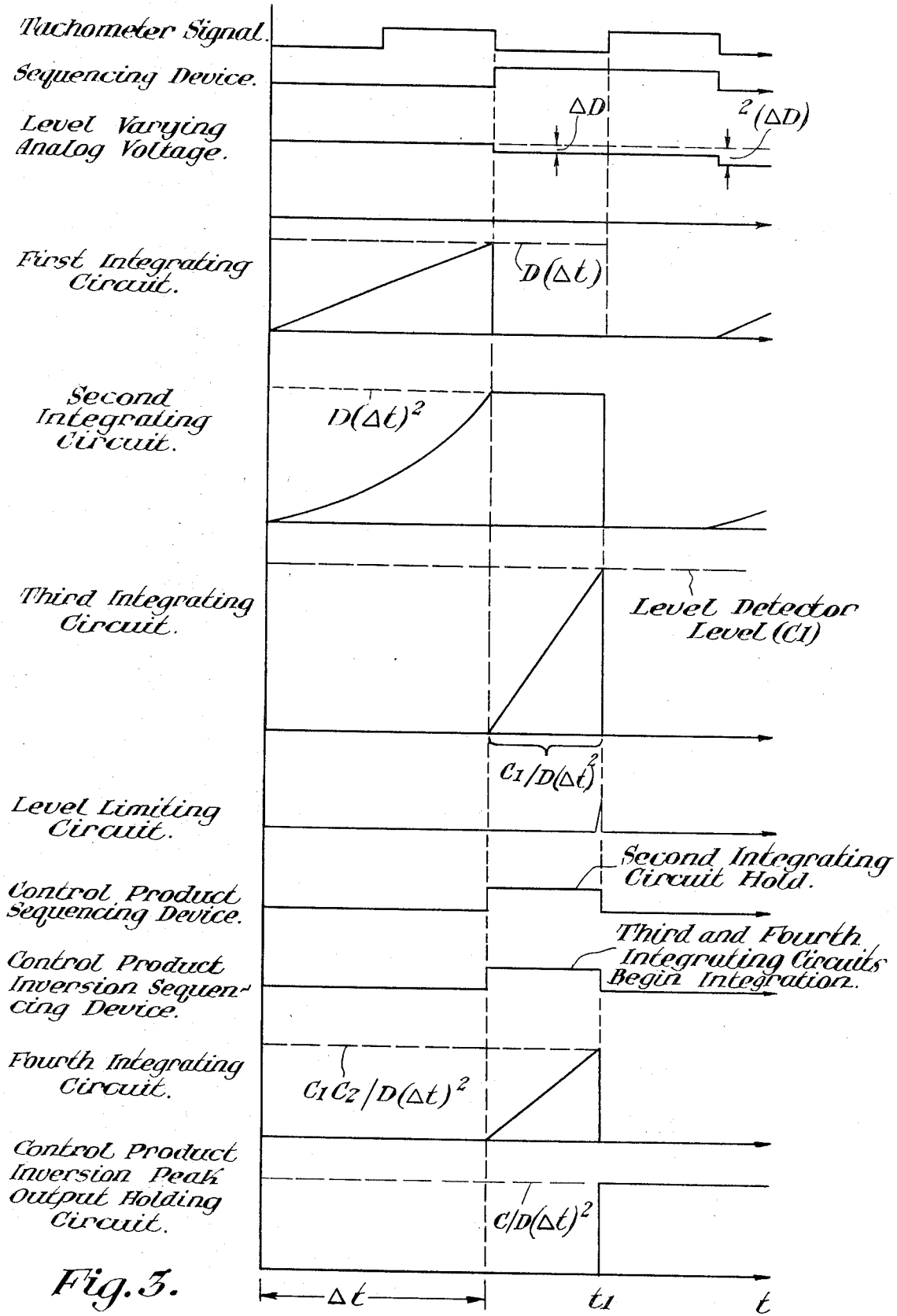

FIG. 3 illustrates a timing chart for pertinent circuits in FIG. 1 and FIG. 2.

A description of the above embodiments will follow and then the novel features of the invention will appear in the appended claims.

SYSTEM DESCRIPTION

Reference is now made to the drawings and particularly to FIG. 1 which illustrates in block diagram form the unique acceleration monitoring circuit embodying the present invention. As shown, a train 10 is traveling along the tracks 20 in a direction indicated by the arrow 15. It should be understood that all of the block components shown in FIG. 1 are train carried and these components have been set out in the manner depicted only for purposes of illustration.

The train 10 has a mechanical coupling 12, shown in a broken line between a wheel 11 and a tachometer 13. As the train 10 moves along the track 14 the tachometer 13 is driven through mechanical coupling 12 at a rate proportional to vehicle speed. The tachometer 13 is of the type that will produce a pulsed output and this pulsed output will appear on leads 14 and 14a from the tachometer 13. The tachometer 13 may be of the type shown and described in the copending application for Letters Patent of the United States, Ser. No. 724,041, Filed Apr. 25, 1968 by Reed H. Grundy, for Pulse Generator, which application is assigned to the same assignee as this application. In the alternative, the tachometer 13 may be any conventional device and/or circuitry which produces pulsed outputs at rates proportional to vehicle axle rotation. A typical pulse output of tachometer 13 present on leads 14 and 14a is depicted in FIG. 3 and is designated by the heading TACHOMETER SIGNAL. The cooperative function of this pulse output with the other components of the system will be more fully explained hereafter.

When the system commences operation, i.e. when it is desired to monitor acceleration over a particular distance range the tachometer pulses present on lead 14 will be the input to the sequencing device 16. The sequencing device 16 is selected such that if the pulse period of the input pulse 16 is $\Delta t$ seconds, as shown in FIG. 3 by the heading TACHOMETER SIGNAL, then the output from sequencing device 16 present on leads 17, 17a, and 17b will be a pulsed output, which pulses have one-half pulse period equal to $\Delta t$ seconds. The sequencing device 16 may be a relay actuated device or any conventional flip-flop device which produces a change of state in its output upon each successive negative or positive (but not both) going pulse edge. The pulsed output from sequencing device 16 is shown in FIG. 3 by the heading SEQUENCING DEVICE.

The distance measuring circuit 18 produces an output on lead 19 which is a level varying analog voltage. The discrete levels of this analog voltage are separated by a change in distance $\Delta D$, which change occurs upon the completion of a tachometer pulse, as shown in FIG. 3 by the heading LEVEL VARYING ANALOG VOLTAGE. The distance measuring circuit may be of the type shown and described in the copending application for Letters Patent of the United States, Ser. No. 771,030, Filed Oct. 28, 1968, by William Carter, Jr. et al., for Digital to Analog Conversion Circuit, which application is assigned to the same assignee as this application.

As shown, both the output 19 from distance measuring circuit 18, and the output 17, 17a from the sequencing device 16 are inputs to a control product circuit 21 along with an output 25 from a control product inversion circuit 23. The interior circuit functions of the control product circuit 21 will be more fully explained hereinafter. The control product circuit 21 produces an output on lead 22 which reaches a peak at the end of $\Delta t$ seconds which is the product of the level varying analog voltage present on lead 19 and the square of $\Delta t$ seconds which is the square of one-half of a pulse period of the output present on leads 17, 17a. The output on lead 22 of the control product circuit 21 is shown in FIG. 3 by the heading SECOND INTEGRATING CIRCUIT. It should be noted that the above-mentioned peak of the output present on lead 22 is held for a time after $\Delta t$ seconds, as shown in FIG. 3. The method of holding and time held will be explained more fully hereinafter.

Accordingly, the output 22 from the control product circuit 21 is the input to the aforementioned control product inversion circuit 23, along with the output 17b from sequencing device 16. The control product inversion circuit 23, thence, produces two outputs respectively present on leads 24 and 25. The output from the control product inversion circuit 23 has a peak value at a time greater than $\Delta t$ seconds which is inversely proportional to the output on lead 22 from the control product circuit 21, and analogous to a control acceleration for the train 10. The output on lead 25 from the control product inversion circuit 23 is controllingly electrically coupled to the control product circuit 21 to provide the holding of the peak of the output present on lead 22 for a time after $\Delta t$ seconds.

The actual analog acceleration deriving device 26 has the pulsed output from the tachometer 13 present on lead 14a as its input. This actual analog acceleration deriving device 26 may be any conventional circuitry which converts the pulsed output on lead 14a from tachometer 13 into a voltage analogous to train velocity, and thence through derivative-taking circuits derives a voltage analogous and proportional to actual vehicle acceleration. This voltage analogous to actual vehicle acceleration is present on output lead 27 from actual analog acceleration deriving device 26. The actual analog acceleration device 26 is conventional.

Accordingly, the outputs present on leads 24 and 27 from the control product inversion circuit 23 and the actual analog acceleration deriving device 26, respectively, are inputs to a control product inversion utilization circuit 28. The output of the control product inversion utilization circuit 28 present on lead 29 is a comparison of the peak voltage of the output present on lead 24 from the control product inversion circuit 23 and the output present on lead 27 from the actual analog acceleration deriving device 26. This output on lead 29 from the control product inversion utilization circuit 28 is the input into a braking device 31 which consists of circuitry which either applies the brakes of train 10, releases the brakes of train 10, or does relatively nothing to the brakes of train 10, when actual vehicle acceleration is respectively greater than, less than, or equal to control vehicle acceleration. No details of the braking device will be given in view of the fact that it does not form part of the instant invention.

SYSTEM OPERATION

The embodiment of the acceleration monitoring circuit of the present invention shown in FIG. 1 will now be explained in greater detail as it is shown in FIG. 2. When monitoring begins, the tachometer 13, coupled to wheel 11 of train 10 by coupling 12 produces a signal, shown in FIG. 3 by the heading TACHOMETER SIGNAL on the leads 14 and 14a. The signal on leads 14 and 14a is a pulse signal produced at rates according to the speed of train 10, and one complete pulse cycle of this pulse signal has a length of $\Delta t$ seconds as shown in FIG. 3. Accordingly, the pulse signal on lead 14 is an input to a sequencing device 16 which produces output signals on leads 17, 17a, 17a', 17a'', and 17b. These output signals are also pulse signals which have complete pulse cycles, i.e. they are periodic in nature, one-half of any one cycle on leads 17, 17a, 17a', 17a'', and 17b being equal to $\Delta t$ seconds. The circuitry of the sequencing device 16 is such that there is a change of state in the output of the sequencing device 16 upon the input of each successive negative to positive (but not both) going pulse edge.

The distance measuring circuit 18 produces an output on lead 19 which is a level varying analog voltage, the derivation of which is hereinbefore described, representing distance to a given point on the distance range over which acceleration is monitored. As shown, the output on lead 19 from the distance measuring circuit 18 and the output over leads 17, 17a, and 17a' are both inputs to a first integrating circuit 35 of control product circuit 21. A first integrating circuit 35, thereby produces an output which is the integration of the level varying analog voltage on lead 19 over $\Delta t$ seconds on lead 38, which output reaches a peak value, at the end of $\Delta t$ seconds, equal to the product of the level varying analog voltage present on lead 19 and $\Delta t$ seconds. The waveform of the output from the first integrating circuit, present on lead 38, is shown in FIG. 3 by the heading FIRST INTEGRATING CIRCUIT.

The output of the sequencing device 16 is also an input to a control product sequencing device 36 of control product circuit 21 over leads 17, 17a, and 17a''. The control product sequencing device 36 may be a relay actuated device of any conventional flip-flop which produces a change of state in its output upon a change in state in its input. The control product sequencing device 36 also has a controlling input 44a to be more fully discussed hereinafter. The waveform of the output of the control product sequencing device 36, present on lead 37, is shown in FIG. 3 by the heading CONTROL PRODUCT SEQUENCING DEVICE. This output from the control product sequencing device 36, present on lead 37 is an input, along with the output from first integrating circuit 35, present on lead 38, to a second integrating circuit 39 of control product circuit 21, such that the second integrating circuit 39 simultaneously integrates the output from the first integrating circuit 35, present on lead 38, over $\Delta t$ seconds, and holds the peak value reached at $\Delta t$ seconds for a time $(t_1-\Delta t)$ seconds. The determination of the time $t_1$ will be explained hereinafter. The value reached at $\Delta t$ seconds of the output, present on lead 22, from the second integrating circuit 39 is a peak value, and the waveform of the output on lead 22 is shown in FIG. 3 by the heading SECOND INTEGRATING CIRCUIT. The waveform shows the above peak value of the output from the second integrating circuit 39, which corresponds to the output from the control product circuit 21, to be the product of the level varying analog voltage, present on lead 19, and the square of $\Delta t$ seconds.

As shown, the digital pulse output from the sequencing device 16, present on leads 17 and 17b is an input to a control product inversion sequencing device 45. The control product inversion sequencing device 45 may be a relay actuated device or any conventional flip-flop which produces a change of state in its output upon changes of state in its input.

Another input to the control product inversion sequencing device 45 is the output from a level limiting circuit 43 present on lead 44. The output on leads 44 is present whenever the input to the level limiting circuit 43, present on lead 42, reaches a predetermined peak value, to thereby cause the control product inversion sequencing device 45 to change its output state on leads 46 and 46a. The output from the level limiting circuit 43 is also an input to the control product sequencing device 36 of the control product circuit 21 appearing on lead 44a to thereby cause the control product sequencing device 36 to change its output state on lead 37 upon the occurrence of the predetermined peak value at the input lead 42 of the level limiting circuit 43. This peak value occurs at the aforementioned time $t_1$, and the change in the output state of the control product sequencing device 36 causes the second integrating circuit 39 to discontinue the holding of its above-mentioned peak value.

As shown, the output from the second integrating circuit 39, present on lead 22, is an input to a third integrating circuit 41 of the control product inversion circuit 23 along with the output from the control product inversion sequencing device 45, present on lead 46a. The circuitry of the third integrating circuit 41 in correlation with the output from the control product sequencing device 45 on lead 46a is such that it will only integrate the output from the second integrating circuit 39, on lead 22, at times greater than or equal to $\Delta t$, and less than or equal to $t_1$. Thus, the third integrating circuit 41 will only integrate the peak value produced by the second integrating circuit 39 from $\Delta t$ seconds to $t_1$ seconds due to the controlling output of the control product inversion sequencing device on lead 46a. The output from the third integrating circuit 41, present on lead 42 which is an input to the level limiting circuit 43 reaches the predetermined peak value of the level limiting circuit 43 at the time $t_1$ seconds, thus causing the level limiting circuit 43 to produce its output on leads 44 and 44a. Hence, it is seen that the value of the time $t_1$ seconds is solely controlled by the preselected value which causes the level limiting circuit 43 to produce an output on the leads 44 and 44a. The waveform present on outputs 42, 44 and 44a and 46 and 46a respectively from third integrating circuit 42, level limiting circuit 43, and control product inversion sequencing device 45, are shown in FIG. 3 by the respective headings THIRD INTEGRATING CIRCUIT, LEVEL LIMITING CIRCUIT, and CONTROL PRODUCT INVERSION SEQUENCING DEVICE.

As shown, a constant input voltage is present on lead 47 to a fourth integrating circuit 48 of the control product inversion circuit 23. Another input to the fourth integrating circuit 48 is the output from the control product inversion sequencing device 45, present on lead 46. The circuitry of the fourth integrating circuit 48 is similar to that of the third integrating circuit 41 insofar as the fourth integrating circuit 48 will only integrate the constant voltage input on lead 47 from $\Delta t$ seconds to $t_1$ due to the controlling input on lead 46, produced by the control product inversion sequencing device 45. Thus, the fourth integrating circuit will produce an output, on lead 49, which also reaches a peak value at $t_1$ seconds. The waveform of the output from the fourth integrating circuit is shown in FIG. 3 by the heading FOURTH INTEGRATING CIRCUIT.

Accordingly, the output from the fourth integrating circuit 48, on lead 49, is an input to a control product inversion peak output holding circuit 50 of the control product inversion utilization circuit 28, which includes circuitry which causes the peak value of the output from the fourth integrating circuit 48 to be held for a time greater than $t_1$ seconds. Hence, the output from the control product inversion peak output holding circuit 50, present on lead 51 is the peak value of the output from the fourth integrating circuit 48. This output is analogous and proportional to the control acceleration of train 10. The waveform of the output from the control product inversion peak output holding circuit 50, present on lead 51, is shown in FIG. 3 by the heading CONTROL PRODUCT INVERSION PEAK OUTPUT HOLDING CIRCUIT.

The output from the control product inversion peak output holding circuit 50, present on lead 51, is an input to a comparison circuit 52 of the control product inversion utilization circuit 28, along with the output from the predescribed actual analog acceleration deriving device 26, present on lead 27. It will be recalled that the output present on lead 27 is an analog value of the actual acceleration of train 10 as derived by the actual analog acceleration deriving device 26 from the digital pulse output from tachometer 13, present on lead 14a. Hence, the comparison circuit 52 contains circuitry such that it will provide an output on lead 29 whenever the values of actual analog acceleration and the control acceleration analog are unequal. Thus, an input to a braking device 31 will cause the brakes of train 10 to be applied whenever the actual acceleration analog exceeds the control acceleration analog and the releasing of the brakes of train 10 whenever the control acceleration analog exceed the actual acceleration analog. Accordingly, the acceleration of train 10 is monitored.

It should be noted that the times $\Delta t$ seconds and $t_1$ seconds are only relative, in that there will be a $\Delta t$ seconds and a $t_1$ seconds for each complete monitoring cycle. It should be further noted that a complete monitoring cycle consists of two complete tachometer cycles. Thus, at the beginning of each monitoring cycle, the analog voltage value of distance left to be traveled over the predetermined distance range will have decreased by a value of 2 ($\Delta D$).

For purposes of clarity, a mathematical interpretation of circuit functions embodies by the present invention will be rendered with reference to FIG. 2.

1. The analog voltage which is proportional to distance to be traveled over a predetermined range, present on lead 19, is integrated by the first integrating circuit 35 over the time integral $\Delta t$:

$$E_1 = \int_0^{\Delta t} D\, dt = D(\Delta t) \qquad (a)$$

where $D(\Delta t)$ is the peak value of the output present on lead 38.

2. The second integrating circuit 39 simultaneously integrates the output from the first integrating circuit 35 over the time integral $\Delta t$:

$$E_2 = \int_0^{\Delta t} D(\Delta t)\, dt = D(\Delta t)^2 \qquad (b)$$

where $D(\Delta t)^2$ is the peak value of the output present on lead 22.

(3) The value $D(\Delta t)^2$ is then held by second integrating circuit 39 and integrated by the third integrating circuit 41 over the time integral $(t_1 - \Delta t)$ seconds:

$$E_3 = \int_{\Delta t}^{t_1} D(\Delta t)^2\, dt = C_1$$

or $$E_3 = D(\Delta t)^2 (t_1 - \Delta t) = C_1 \qquad (c)$$

where $C_1$ is the peak value of the output present on lead 42, as determined by the level limiting circuit 43. Hence, we have $$(t_1 - \Delta t) = \frac{C_1}{D(\Delta t)^2} \qquad (d)$$

(4) We have now generated a time $(t_1 - \Delta t)$ which is proportional to $$\frac{1}{D(\Delta t)^2}$$

It is desired to generate a voltage proportional to $$\frac{1}{D(\Delta t)^2}$$

Knowing that the fourth integrating circuit 48 will integrate the constant input voltage on lead 47 over the time integrate $(t_1 - \Delta t)$, we have:

$$E_4 = \int_{\Delta t}^{t_1} C_2\, dt$$

where $C_2$ is the value of the constant voltage on lead 47, or $$E_4 = C_2(t_1 - \Delta t) \qquad (e)$$

(5) But from (d) we know that $$(t_1 - \Delta t) = \frac{C_1}{D(\Delta t)^2}$$

substituting this relation into (e), we have $$E_4 = \frac{C_1 C_2}{D(\Delta t)^2} = \frac{C_3}{D(\Delta t)^2} \qquad (f)$$

where $C_3 = C_1 C_2 =$ constant.

Thus we have generated a voltage analogous and proportional to a control acceleration for train 10 in FIG. 3, and comparison of this voltage with a voltage analogous and proportional to the actual acceleration of train 10 provides a monitoring of the acceleration of train 10.

While the present invention has been described with reference to a particular embodiment, it is to be understood that other modifications, changes, and variations may be made by those skilled in the art without departing from the spirit of the invention or scope of the claims.

We claim:

1. A reference circuit for producing and utilizing an inverted control product parameter by comparing said inverted control product parameter with an actual parameter so that said referencing will occur, and including in combination a. a sequencing device having an input and an output, said input being a pulse input having a period equal to $\Delta t$ seconds, said output being a pulse output having a one-half period equal to $\Delta t$ seconds, b. a "control product" circuit having first, second and third inputs, said first input being a level varying analog voltage, said second input being said pulse output of said sequencing device, said "control product" circuit producing an output which has a peak value, said peak value being the product of said level varying analog voltage and the square of said one-half period of said pulse output from said sequencing means, c. a "control product" inversion circuit having first, second and third inputs, said first input being said output of said "control product" circuit, said second input being said pulse output of said sequencing device, said third input being a constant voltage, said "control product" inversion circuit producing first and second outputs, said first output being inversely proportional to said output of said "control product" circuit and having a peak value, said second output controllingly electrically coupled to said "control product" circuit as said third input to said "control product" circuit, d. a "control product" inversion utilization circuit having first and second inputs, said first input being said first output from said "control product" inversion circuit, said second input being said actual parameter, said "control product" inversion utilization circuit producing an output which is a comparison of said actual parameter and said peak value of said output from said "control product" inversion circuit.

2. An acceleration reference circuit for producing and utilizing a first parameter analogous and proportional to a control acceleration of a vehicle by comparing said first parameter with a second parameter analogous and proportional to actual vehicle acceleration, so that said referencing will occur over a predetermined distance range and including in combination, a. a sequencing device having an input and an output, said input being a pulse input, which pulses have pulse rates in accordance with the velocity of said vehicle, said pulse input having a period equal to $\Delta t$ seconds, said output being a pulse output having one-half period equal to $\Delta t$ seconds, b. a control product circuit having first, second and third inputs, said first input being a level varying voltage, said level varying voltage being analogous to the distance left to be traveled over said predetermined distance range, said second input being said pulse output of said sequencing device, said control product circuit producing an output which has a peak value, said peak value being the product of said level varying voltage and the square of said one-half period of said pulse output from said sequencing means, c. a control product inversion circuit having first, second and third inputs, said first input being said output of said control product circuit, said second input being said pulse output of said sequencing device, said third input being a preselected constant voltage, said control product inversion circuit producing first and second outputs, said first output being inversely proportional to said output of said control product circuit and having a peak value, said first output of said control product circuit being analogous and directly proportional to said vehicle control acceleration, said second output controllingly electrically coupled to said control product circuit as said third input to said control product circuit, d. a control product inversion utilization circuit having first and second inputs, said first input being said output from said control product inversion circuit, said second input being said second parameter analogous and proportional to actual vehicle acceleration, said control product inversion utilization circuit producing an output which is a comparison of said actual vehicle acceleration parameter and said vehicle control acceleration parameter.

3. The acceleration reference circuit of claim 2 wherein said control product circuit includes in combination,
   a. a first integrating circuit having first and second inputs and an output, said first input of said first integrating circuit being said level varying analog voltage, said second input of said first integrating circuit being said pulse output of said sequencing device, said output of said first integrating circuit being the integration of said level varying voltage over said $\Delta t$ seconds, said output reaching a peak value, at the end of said $\Delta t$ seconds, equal to the product of said level varying voltage and said $\Delta t$ seconds,
   b. a control product sequencing device having first and second inputs and an output, said first input of said control product sequencing device being said pulse output of said sequencing device, said second input of said control product sequencing device being said second output of said control product inversion circuit,
   c. a second integrating circuit having first and second inputs and an output, said first input of said second integrating circuit being said output of said first integrating circuit, said second input of said second integrating circuit being said output from said control product sequencing device, such that said second integrating circuit simultaneously integrates said output of said first integrating circuit over $\Delta t$ seconds, thus producing said output of said second integrating circuit having a peak value equal to the product of said level varying voltage and the square of said $\Delta t$ seconds, said peak value of said output of said second integrating circuit being held for a holding time $(t_1-t)$ seconds, where the time $t_1$ is determined by said second output of said control product inversion circuit.

4. The accelerating reference circuit of claim 2 wherein said control product inversion circuit includes in combination,
   a. a control product inversion sequencing device having first and second inputs and an output, said first input being said pulse output from said sequencing device,
   b. a level limiting circuit having an input and an output, said level limiting circuit producing said output when said input reaches a predetermined peak value,
   c. a third integrating circuit having first and second inputs and an output, said first input being said output from said control product circuit, said second input being said output from said control product inversion sequencing device which controllingly regulates said third integrating circuit such that said third integrating circuit will only integrate said output from said second integrating circuit at times greater than or equal to said time $\Delta t$, thereby producing said output from said third integrating circuit to provide said input to said level limiting circuit, said output from said third integrating circuit reaching said predetermined peak value at time $t$, to thereby cause said level limiting circuit to produce said level limiting circuit output, said level limiting circuit output controllingly electrically coupled to said control product inversion sequencing device as said second input to said control product inversion sequencing device, said output from said level limiting circuit also controllingly electrically coupled to said control product sequencing device as said second input to said control product sequencing device to thereby hold said peak value of said output of said second integrating circuit for said holding time $(t_1 -\Delta t)$ seconds, said output from said control product inversion sequencing device controllingly electrically coupled to said third integrating circuit as said second input to said third integrating circuit,
   d. a fourth integrating circuit having first and second inputs and an output, said first input being a preselected constant voltage, said second input being said output of said control product inversion sequencing device, such that said fourth integrating circuit will integrate said preselected constant voltage from the time $\Delta t$ seconds to said time $t_1$ seconds thereby providing said output of said fourth integrating circuit, said output of said fourth integrating circuit reaching a peak value at said time $t_1$ seconds, said peak value of said output being of said fourth integrating circuit being of said first parameter analogous and proportional to said control vehicle acceleration.

5. The acceleration reference circuit of claim 2, wherein said control product inversion utilization circuit includes in combination,
   a. a control product inversion peak output holding circuit having an input and an output, said input being said output of said fourth integrating circuit, said output of said control product inversion peak output holding circuit being said peak value of said output of said fourth integrating circuit,
   b. a comparison circuit having first and second inputs and an output, said first input of said comparison circuit being said output of said control product inversion peak output holding circuit, said second input of said comparison circuit being said second parameter analogous and proportional to said actual vehicle acceleration, said comparison circuit producing said output of said comparison circuit whenever said actual vehicle acceleration parameter and said control vehicle acceleration parameter are unequal, said output of said comparison circuit thereby providing said acceleration monitoring.

6. A circuit including in combination,
   a. a sequencing device having an input and an output, said input being a pulse having a period equal to $\Delta t$ seconds, said output being a pulse having a half period equal to $\Delta t$ seconds,
   b. a "control product" circuit having first, second, and third inputs, said first input connected to a source of varying analog voltage, said second input connected to said output pulse of said sequencing device,
   said control product circuit having an output the peak value of which is the product of said level varying analog voltage and the square of said half period of said output pulse of said sequencing device,
   c. a "control product" inversion circuit having first, second, and third inputs, said first input connected to said output of said "control product" circuit, said second input connected to said output pulse of said sequencing device and said third input connected to a source of constant voltage,
   said "control product" inversion circuit producing first and second outputs, said first output connected to the third input of said "control product" circuit and said second output having a peak value which is inversely proportional to said peak value of said "control product" circuit output.